US005237769A

United States Patent [19]

Navarro

[11] Patent Number: 5,237,769

[45] Date of Patent: Aug. 24, 1993

[54] FISHING ROD BALANCE DEVICE

[76] Inventor: Kenneth D. Navarro, 2904 Grange Ave., Stockton, Calif. 95204

[21] Appl. No.: 906,100

[22] Filed: Jun. 29, 1992

[51] Int. Cl.[5] .............................................. A01K 97/10

[52] U.S. Cl. ........................................ 43/21.2; 43/25; 248/538

[58] Field of Search ................... 43/21.2, 25; 248/538, 248/534, 205.2; 24/16 PB, 16 R, 442, 306

[56] References Cited

U.S. PATENT DOCUMENTS

| | | | |
|---|---|---|---|
| 4,712,766 | 12/1987 | Ehremhalt | 24/16 R |
| 4,759,963 | 7/1988 | Uso | 43/54.1 |
| 4,819,903 | 4/1989 | Jimemes | 248/538 |
| 5,052,146 | 10/1991 | Resnick | 43/21.2 |
| 5,104,076 | 4/1992 | Goodall | 24/306 |

*Primary Examiner*—Kurt C. Rowan
*Attorney, Agent, or Firm*—Leon Gilden

[57] ABSTRACT

A balance device arranged to reduce false movement of bait to a fishing line for indication of a fish strike includes a flexible cover wrap configured in a mandrel configuration surrounding a fishing rod of a fishing rod assembly. The cover wrap includes a cover wrap axis intersecting a center of gravity of the fishing rod assembly, with a cover wrap support having a cover wrap support axis orthogonally oriented relative to the cover wrap axis for positioning upon a support surface to provide for balancing of the organization for indication of fish strike. The cover wrap support may be configured of a tubular configuration having a securement strap directed therethrough for securement about an underlying support surface.

1 Claim, 4 Drawing Sheets

11
23
25
S
12
27
26
14a
25
20
22
18a
17

11
23
25
S
12
27

26
25
14a
20

22
18a
17

23
13
24
19
14
20
11
18a

FISHING ROD BALANCE DEVICE

BACKGROUND OF THE INVENTION

1. Field of the Invention

The field of invention relates to fishing rod apparatus, and more particularly pertains to a new and improved fishing rod balance device arranged to balance a fishing rod to indicate a fish strike relative to the fishing rod structure.

2. Description of the Prior Art

In a fishing procedure, sensitivity to bait movement relative to a fish strike and the like is camouflaged to a degree by manual securement of the fishing rod during the fishing procedure. The instant invention attempts to overcome deficiencies of the prior art by providing for a balance device structure to provide for balancing the fishing rod to enhance manual sensitivity to a fish strike relative to bait utilized by the fishing rod assembly. Prior art fishing rod support organizations are available in the prior art but have heretofore not been arranged to coincide with the fishing rod assembly's center of gravity and are typically arranged for fixed securement of the fishing rod structure, such as indicated in Tucker U.S. Pat. No. 4,972,621 having a post directed into underlying ground structure.

Accordingly, it may be appreciated there continues to be a need for a new and improved fishing rod balance device as set forth by the instant invention which addresses both the problems of ease of use as well as effectiveness in construction and in this respect, the present invention substantially fulfills this need.

SUMMARY OF THE INVENTION

In view of the foregoing disadvantages inherent in the known types of fishing rod apparatus now present in the prior art, the present invention provides a fishing rod balance device wherein the same is arranged to effect a balancing of a fishing rod relative to its center of gravity for enhanced manual sensitivity to a fish strike. As such, the general purpose of the present invention, which will be described subsequently in greater detail, is to provide a new and improved fishing rod balance device which has all the advantages of the prior art fishing rod apparatus and none of the disadvantages.

To attain this, the present invention provides a balance device arranged to reduce false movement of bait to a fishing line for indication of a fish strike including a flexible cover wrap configured in a mandrel configuration surrounding a fishing rod of a fishing rod assembly. The cover wrap includes a cover wrap axis intersecting a center of gravity of the fishing rod assembly, with a cover wrap support having a cover wrap support axis orthogonally oriented relative to the cover wrap axis for positioning upon a support surface to provide for balancing of the organization for indication of fish strike. The cover wrap support may be configured of a tubular configuration having a securement strap directed therethrough for securement about an underlying support surface.

My invention resides not in any one of these features per se, but rather in the particular combination of all of them herein disclosed and claimed and it is distinguished from the prior art in this particular combination of all of its structures for the functions specified.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. Those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved fishing rod balance device which has all the advantages of the prior art fishing rod apparatus and none of the disadvantages.

It is another object of the present invention to provide a new and improved fishing rod balance device which may be easily and efficiently manufactured and marketed.

It is a further object of the present invention to provide a new and improved fishing rod balance device which is of a durable and reliable construction.

An even further object of the present invention is to provide a new and improved fishing rod balance device which is susceptible of a low cost of manufacture with regard to both materials and labor, and which accordingly is then susceptible of low prices of sale to the consuming public, thereby making such fishing rod balance devices economically available to the buying public.

Still yet another object of the present invention is to provide a new and improved fishing rod balance device which provides in the apparatuses and methods of the prior art some of the advantages thereof, while simultaneously overcoming some of the disadvantages normally associated therewith.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 3 is an isometric illustration of the mandrel rod utilized by the invention.

DESCRIPTION OF THE PREFERRED EMBODIMENT

Figure 1:
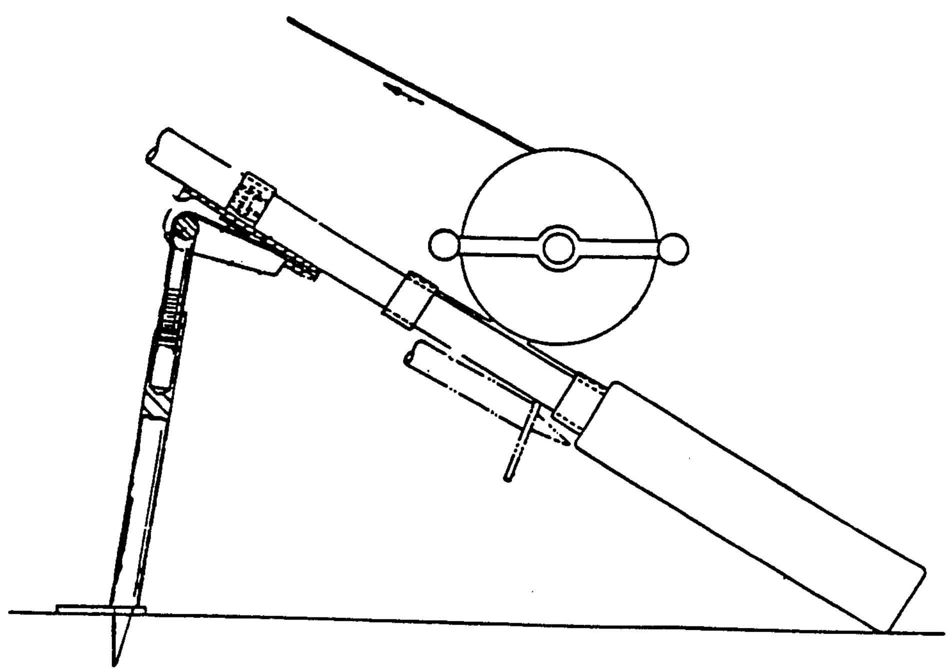
FIG. 1 is an orthographic side view of the fishing rod support structure, as indicated in the prior art U.S. Pat. No. 4,972,621.
Figure 2:
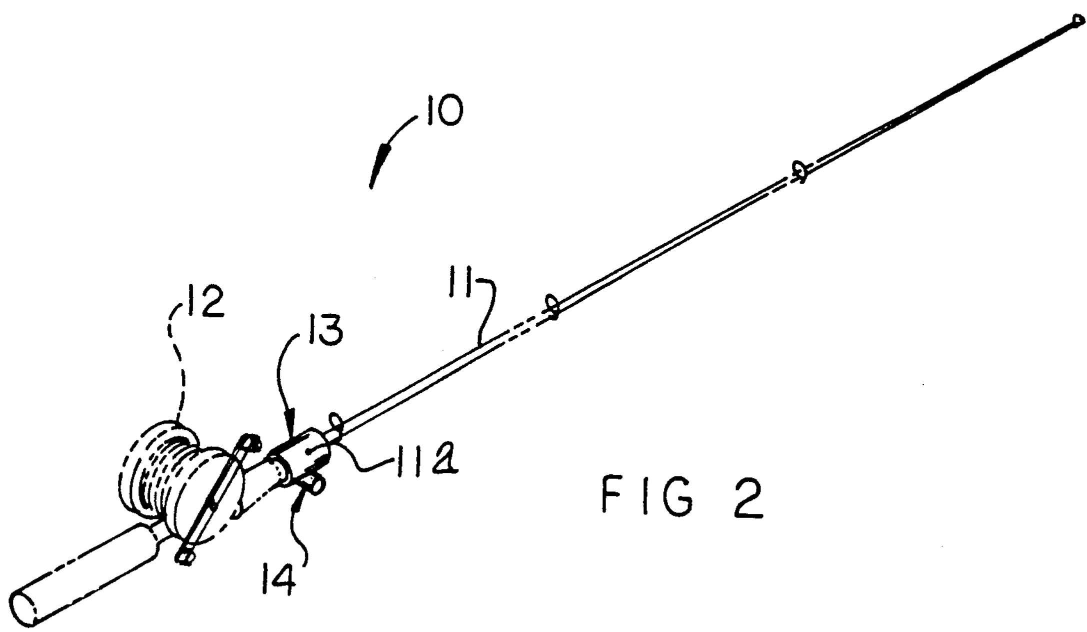
FIG. 2 is an isometric illustration of the invention mounted to an associated fishing rod assembly.
Figure 4:
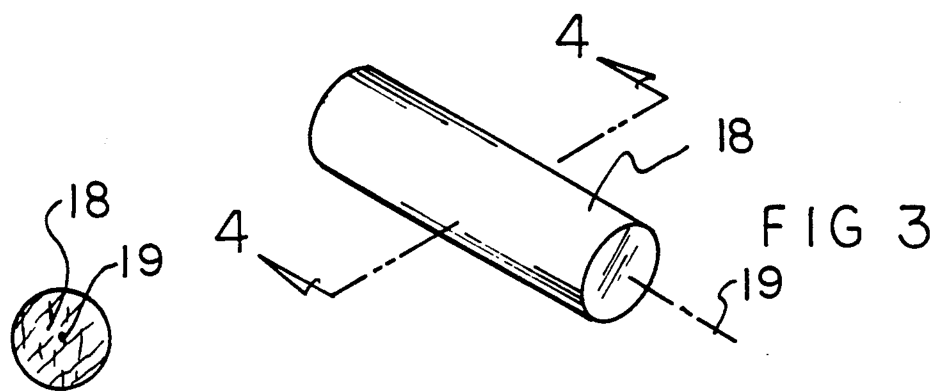
FIG. 4 is an orthographic view, taken along the lines 4—4 of FIG. 3 in the direction indicated by the arrows.
Figure 5:
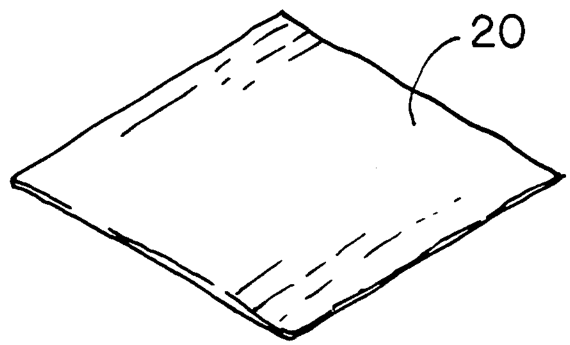
FIG. 5 is an isometric illustration of the mandrel rod cover web.
Figure 6:
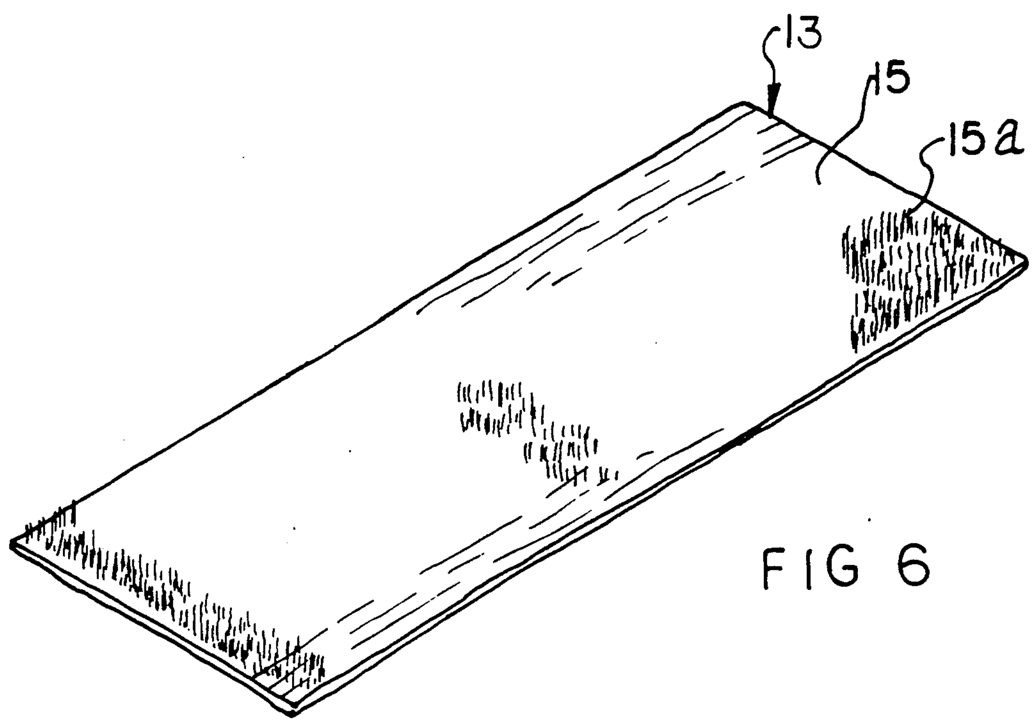
FIG. 6 is an isometric illustration of the cover wrap support web in an opened configuration.
Figure 7:
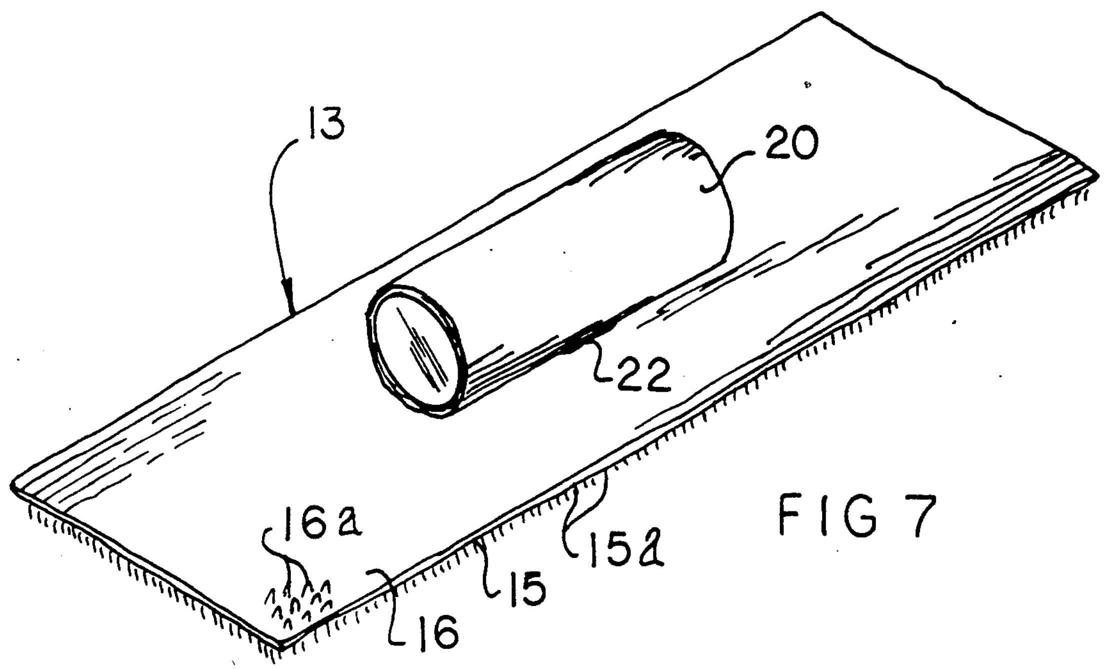
FIG. 7 is an isometric illustration of the cover wrap support mounted to the cover wrap.

With reference now to the drawings, and in particular to FIGS. 1 to 11 thereof, a new and improved fishing rod balance device embodying the principles and concepts of the present invention and generally designated by the reference numeral 10 will be described.

Figure 8:
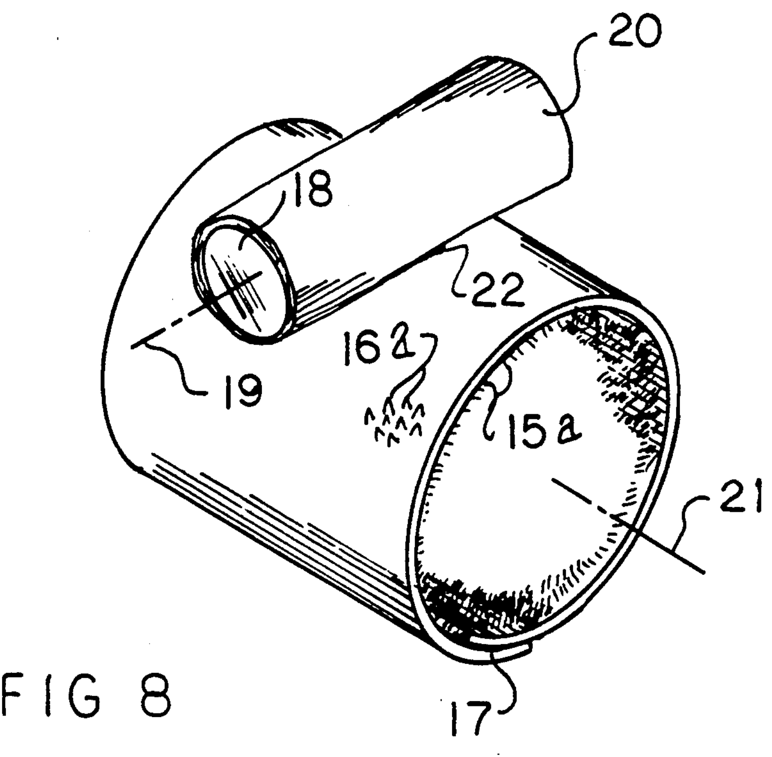
FIG. 8 is an isometric illustration the cover wrap and mandrel support in operative configurations relative to one another.

More specifically, the fishing rod balance device 10 of the instant invention essentially comprises a fishing rod assembly having a fishing rod 11 and a fishing reel 12, with the fishing assembly including a center of gravity 11*a* of the fishing rod assembly that includes a fishing rod 11 and the fishing rod reel 12. A flexible cover wrap 13 is provided secured to a cover wrap support 14 of cylindrical configuration. The cover wrap 13 includes a flexible web having a first surface 15 coextensive with a second surface 16 that are secured to one another at an overlap surface 17 (see FIG. 8 for example), with the first surface having hook fasteners 15*a* securable to loop fasteners 16*a* of the second surface 16. The cover wrap 13 when in an assembled tubular configuration, as illustrated in FIG. 8, includes a cover wrap axis 21. The cover wrap support 14 is formed with a mandrel rod 18 defined thereabout a rod axis 19, with a rod cover web 20 having a predetermined length substantially equal to a predetermined circumference of the mandrel rod 18 and of a width substantially equal to the predetermined length of the rod 18. The mandrel rod axis 19 is orthogonally oriented relative to the cover wrap axis 21 when in an assembled configuration, with a fastener portion 22 fixedly securing the cover wrap to the cover wrap support, as illustrated in FIG. 8. The fastener portion 22 may be of an adhesive or mechanical type, wherein typically an adhesive is utilized for ease of assembly of the cover wrap 13 to the cover wrap support 14. The fishing assembly's center of gravity 23 (see FIG. 11 for example) is oriented medially of the cover wrap 13 when secured about the fishing rod 11. An imaginary line 24 that is colinear with a diameter of the fishing rod 11 that intersects the center of gravity is oriented such that the imaginary line 24 further orthogonally intersects the rod axis 19. In this manner, the cover wrap support 14 provides for an arcuate surface to balance the fishing rod assembly, whereupon a fish strike is more readily apparent to an individual grasping the fishing rod structure and provides for greater visual observation of movement of the fishing rod assembly relative to a fish strike.

Figure 9:
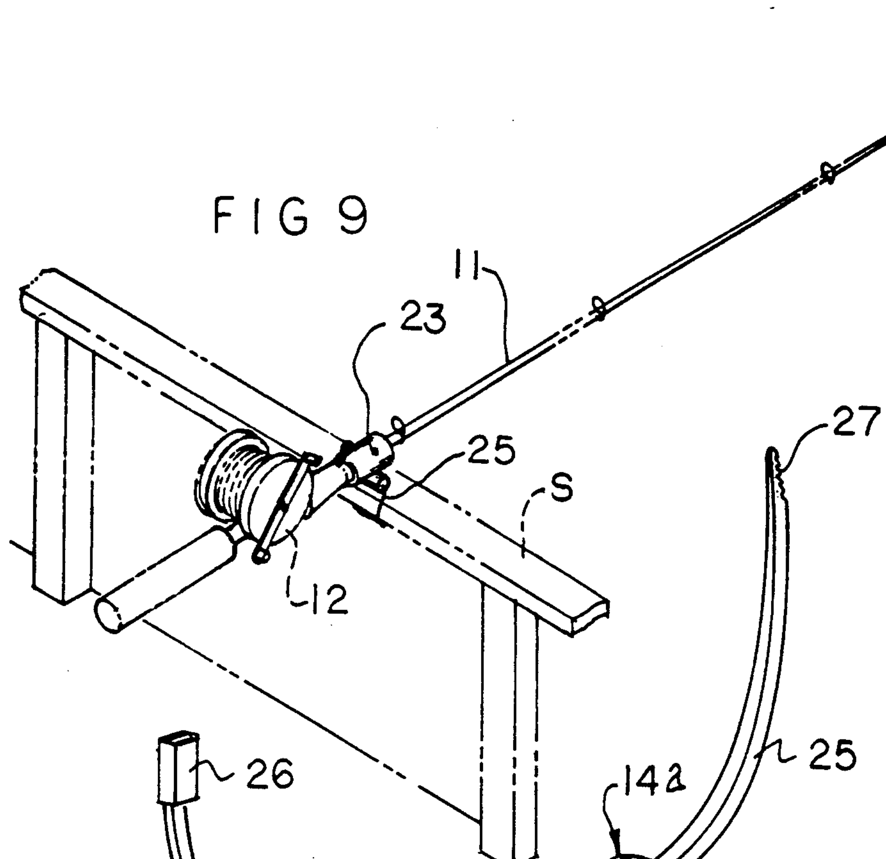
FIG. 9 is an isometric illustration of the invention in an assembled configuration utilizing a securement strap.
Figure 10:
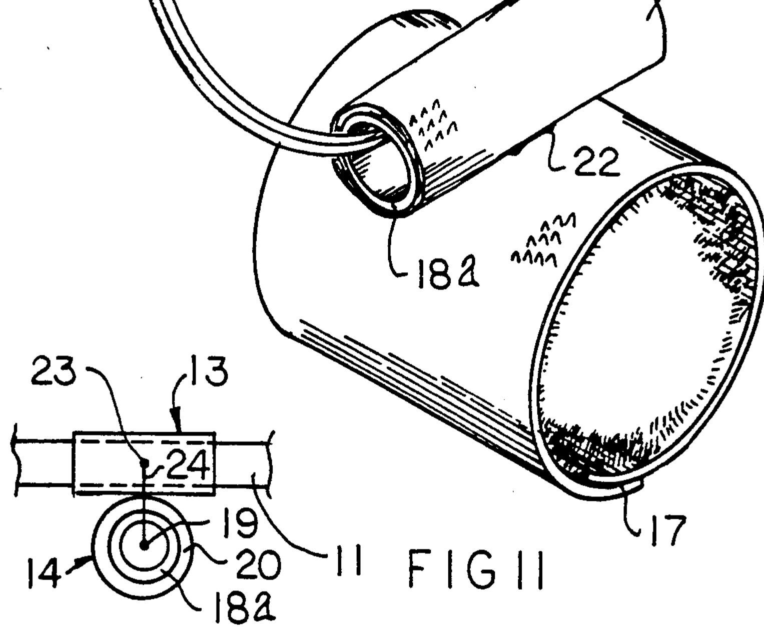
FIG. 10 is an isometric illustration of the invention utilizing the securement strap relative to a tubular mandrel rod.
Figure 11:
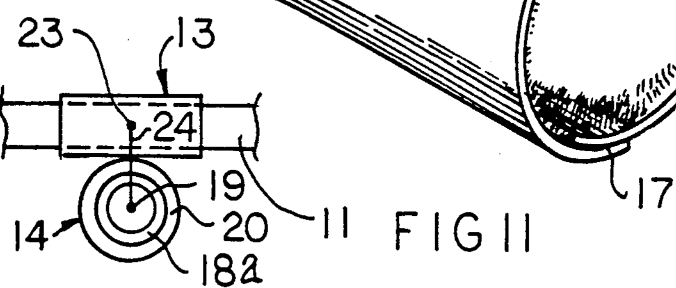
FIG. 11 is an orthographic side view of the positioning of the organization relative to the center of gravity of the fishing rod assembly.

The FIGS. 9 and 10 illustrate the use of the mandrel rod 18 formed of a rod tubular configuration 18*a* having a securement strap 25 directed through the rod tube 18*a*. The securement strap 25 is formed with a first fastener end 26 and a second fastener end 27 that are securable together for securement about an underlying support "S", as illustrated in FIG. 9.

As to the manner of usage and operation of the instant invention, the same should be apparent from the above disclosure, and accordingly no further discussion relative to the manner of usage and operation of the instant invention shall be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A fishing rod balance device in combination with a fishing rod assembly, wherein the fishing rod assembly includes an elongate fishing rod and a fishing rod reel mounted to the fishing rod, wherein the fishing rod assembly includes a center of gravity oriented within the fishing rod in a spaced relationship relative to the fishing rod reel, and a flexible cover wrap, the flexible cover wrap having a first surface coextensive with a second surface, the first surface and second surface are joined together at an overlap surface, and the flexible cover wrap is arranged in surrounding relationship relative to the fishing rod, with the flexible cover wrap having a cover wrap axis, and a cover wrap support, the cover wrap support having a central rod, the central rod including a rod axis, wherein the rod axis is orthogonally oriented relative to the cover wrap axis, and the cover wrap support is arranged for support upon a support surface, and the cover wrap axis is medially intersected by the fishing rod assembly center of gravity, and an imaginary line is directed from the center of gravity medially intersecting the rod axis, and the fishing rod includes a fishing rod diameter directed through the center of gravity coincident with the imaginary line, and the cover wrap support includes a central rod tube having a flexible rod cover web, and the rod cover web is defined by a predetermined length, and the rod tube is defined by a predetermined circumference, and the predetermined circumference is substantially equal to the predetermined length, and the rod tube further includes a securement strap, the securement strap includes a strap first fastener end and a securement strap second fastener end, wherein the securement strap first fastener end is selectively securable to the securement strap second fastener end for securement about the underlying surface.

* * * * *